United States Patent
Timmins et al.

(10) Patent No.: US 11,300,062 B2
(45) Date of Patent: Apr. 12, 2022

(54) CYLINDER CUT-OUT MODES FOR ENGINES

(71) Applicant: Perkins Engines Company Limited, Peterborough (GB)

(72) Inventors: Nicholas Timmins, Perton (GB); James Pardoe, Telford (GB); Simaranjit Gill, Edgbaston (GB); Adam Turnock, Eccleshall (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 17/200,369

(22) Filed: Mar. 12, 2021

(65) Prior Publication Data

US 2021/0285390 A1 Sep. 16, 2021

(30) Foreign Application Priority Data

Mar. 12, 2020 (GB) ..................... 2003578

(51) Int. Cl.
  *F02D 13/00* (2006.01)
  *F02D 13/06* (2006.01)
  *B60R 16/023* (2006.01)
  *F02B 63/04* (2006.01)

(52) U.S. Cl.
  CPC .......... *F02D 13/06* (2013.01); *B60R 16/0232* (2013.01); *F02B 63/042* (2013.01); *F02D 2200/021* (2013.01); *F02D 2200/0414* (2013.01); *F02D 2200/101* (2013.01)

(58) Field of Classification Search
  CPC .............. F02D 13/06; F02D 2200/101; F02D 2200/021; F02D 2200/0414; B60R 16/0232; B02B 63/042

USPC ............... 123/198 F, 481; 701/103, 112, 113
See application file for complete search history.

(56) References Cited

U.S. PATENT DOCUMENTS

| 6,814,059 B2 | 11/2004 | Ito et al. |
| 7,182,070 B2 | 2/2007 | Magel |
| 7,246,596 B2 | 7/2007 | Yamaguchi et al. |
| 7,827,957 B2 | 11/2010 | Ishikawa |
| 2016/0252033 A1 | 9/2016 | Dye et al. |

(Continued)

FOREIGN PATENT DOCUMENTS

| EP | 0386671 A2 | 9/1990 |
| EP | 0953756 B1 | 12/2003 |

(Continued)

OTHER PUBLICATIONS

Great Britain Search Report related to Application No. 2003578.8; dated Apr. 20, 2020.

*Primary Examiner* — Hai H Huynh

(57) ABSTRACT

A method of controlling a cylinder cut-out mode for an engine comprising the steps of:
  a) activating a cylinder cut-out mode in which one or more cylinders of the engine are deactivated;
  b) while the cylinder cut-out mode is active, monitoring one or more deactivation variables; the one or more deactivation variables comprising one or more of:
    an inlet manifold air temperature;
    an engine load factor;
    an engine speed; and
    an engine coolant temperature; and
  c) deactivating the cylinder cut-out mode in order to reactivate any deactivated cylinders when at least one of the deactivation variables exceeds its threshold value.

19 Claims, 2 Drawing Sheets

(56) References Cited

U.S. PATENT DOCUMENTS

2018/0223745 A1* 8/2018 Atterberry .......... F02D 41/0027
2018/0223757 A1   8/2018 McCarthy, Jr. et al.

FOREIGN PATENT DOCUMENTS

| JP | H03202646 A  | 9/1991  |
|----|--------------|---------|
| JP | H05079364 A  | 3/1993  |
| JP | 2008025445 A | 2/2008  |
| JP | 2016223405 A | 12/2016 |

* cited by examiner

CYLINDER CUT-OUT MODES FOR ENGINES

CROSS-REFERENCE TO RELATED APPLICATION

This application claims priority under 35 USC § 119 and the Paris Convention to Great Britian Patent Application 2003578.8 filed on Mar. 12, 2020.

TECHNICAL FIELD

The present disclosure relates to a method of controlling a cylinder cut-out mode for an engine. Further, to an engine comprising a plurality of cylinders and a controller which is enabled to activate a cylinder cut-out mode. Further, to a controller for controlling a cylinder cut-out mode of an engine.

BACKGROUND TO THE DISCLOSURE

Cylinder cut-out (also known as cylinder deactivation) is a known technique to improve fuel efficiency and reduce emissions, especially unburned hydrocarbons, of an internal combustion engine (ICE) during light-load operation. Cylinder cut-out may be achieved by keeping the intake and exhaust valves closed for a particular cylinder or by disabling the fuel injectors of a particular cylinder.

SUMMARY OF THE DISCLOSURE

An embodiment of the present disclosure provides a method of controlling a cylinder cut-out mode for an engine comprising the steps of:

a) activating a cylinder cut-out mode in which one or more cylinders of the engine are deactivated;

b) while the cylinder cut-out mode is active, monitoring one or more deactivation variables; the one or more deactivation variables comprising one or more of:
  an inlet manifold air temperature;
  an engine load factor;
  an engine speed; and
  an engine coolant temperature; and c) deactivating the cylinder cut-out mode in order to reactivate any deactivated cylinders when at least one of the deactivation variables exceeds its threshold value.

Another embodiment of the present disclosure provides an engine comprising a plurality of cylinders and a controller, the controller being enabled to activate a cylinder cut-out mode in which one or more of the plurality of cylinders are deactivated;

the controller being configured to:
a) activate the cylinder cut-out mode;
b) monitor one or more deactivation variables while the cylinder cut-out mode is active; the one or more deactivation variables comprising one or more of:
  an inlet manifold air temperature;
  an engine load factor;
  an engine speed; and
  an engine coolant temperature; and
c) deactivate the cylinder cut-out mode in order to reactivate any deactivated cylinders when at least one of the deactivation variables exceeds its threshold value.

Another embodiment of the present disclosure provides a controller for controlling a cylinder cut-out mode of an engine, the controller being configured to:
a) activate the cylinder cut-out mode;

b) monitor one or more deactivation variables while the cylinder cut-out mode is active; the one or more deactivation variables comprising one or more of:
  an inlet manifold air temperature;
  an engine load factor;
  an engine speed; and
  an engine coolant temperature; and
c) deactivate the cylinder cut-out mode in order to reactivate any deactivated cylinders when at least one of the deactivation variables exceeds its threshold value.

BRIEF DESCRIPTION OF THE DRAWINGS

One or more embodiments of the disclosure will now be described, by way of example only, with reference to the accompanying drawings in which.

DETAILED DESCRIPTION

Unless defined otherwise, all technical and scientific terms used in this specification have the same meaning as is commonly understood by the reader skilled in the art to which the claimed subject matter belongs. It is to be understood that the foregoing summary of the disclosure and the following examples are exemplary and explanatory only and are not restrictive of any subject matter claimed.

The following description is directed to embodiments of the disclosure. The description of the embodiments is not meant to include all the possible embodiments of the disclosure that are claimed in the appended claims. Many modifications, improvements and equivalents which are not explicitly recited in the following embodiments may fall within the scope of the appended claims. Features described as part of one embodiment may be combined with features of one or more other embodiments unless the context clearly requires otherwise.

In this specification, the use of the singular includes the plural unless the context clearly dictates otherwise. In this application, the use of "and/or" means "and" and "or" unless stated otherwise.

Figure 1:
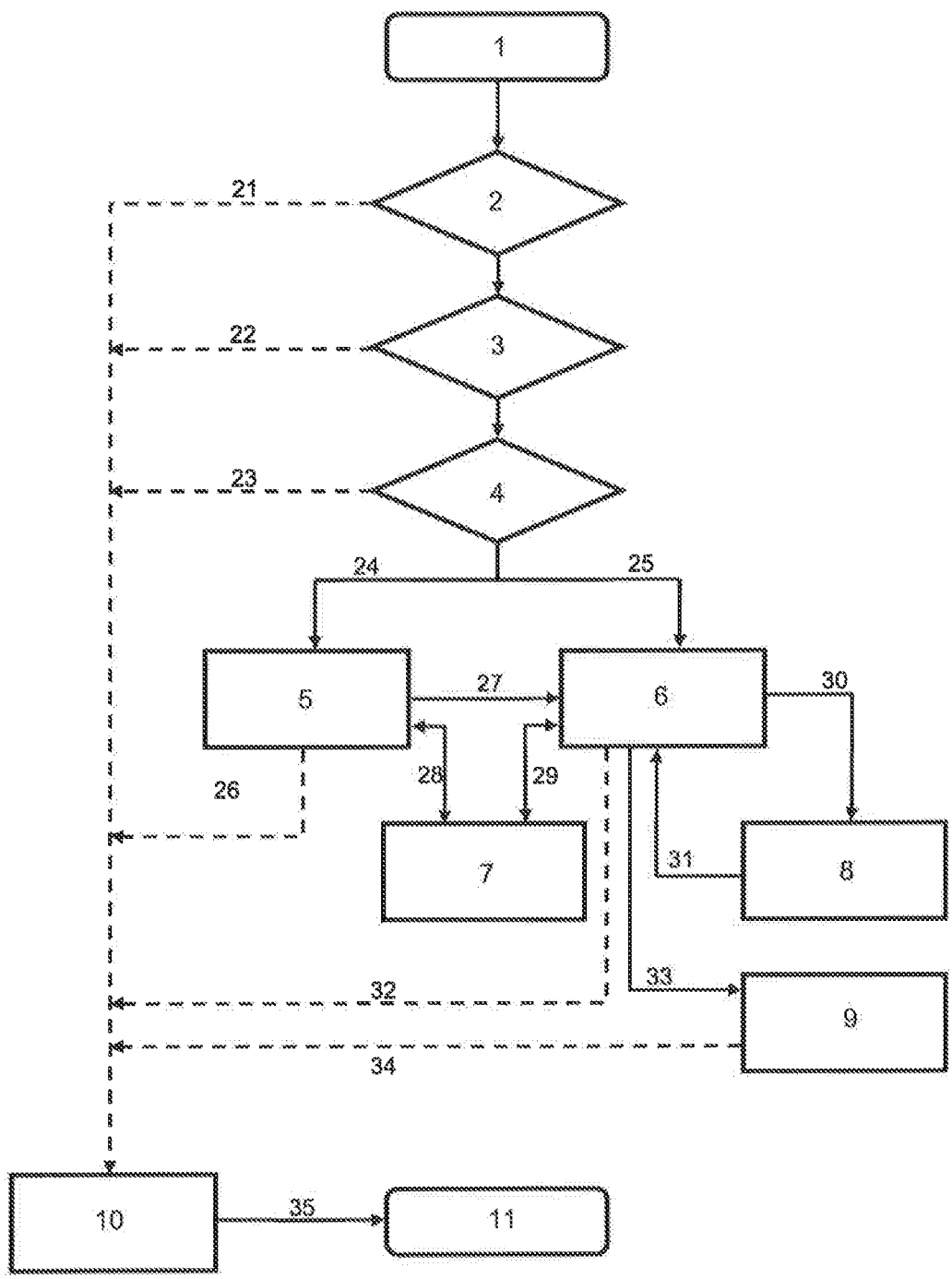
FIG. 1 is a schematic flow chart of an embodiment of a cylinder cut-out protection method according to the present disclosure.

FIG. 1 shows a schematic flow chart of an embodiment of a cylinder cut-out protection method according to the present disclosure.

The method may be used to determine when to activate a cylinder cut-out mode for an engine and/or when to pause/suspend a cylinder cut-out mode for an engine and/or when to de-activate a cylinder cut-out mode for an engine.

The method may be applied to an engine to control the functioning of the engine. The method may be applied during start-up of an engine and/or during idle of an engine and/or during low load conditions of an engine.

The engine may form part of a machine or may be a stand-alone engine. The machine may comprise a mobile or stationary machine. The machine may comprise a wheeled or tracked machine. The machine may be for use in the construction and/or mining industries. The machine may comprise a tractor, bulldozer, pipelayer, motorgrader, wheeled scraper, excavator, backhoe loader, track loader, wheel loader, articulated dump truck, rigid dump truck or roller, by way of example. The machine may comprise a locomotive. The engine may be a variable-speed engine.

The engine may form part of generator, also referred to as a genset. The generator may be a stationary generator or mobile generator. The generator may be a standby generator. The generator may be used to generate electricity or electricity and useful heat in combination as part of a combined heat and power (CHP) generator. The engine may be a fixed-speed engine.

The engine may be or comprise an internal combustion engine (ICE). The ICE may use diesel as its primary fuel. The diesel may, for example, be conventional diesel or biodiesel.

The engine may have multiple cylinders. The engine may have 2 or more cylinders, optionally 4 or more cylinders, optionally 6 or more cylinders, optionally 8 or more cylinders, optionally 12 or more cylinders, optionally 16 or more cylinders, optionally 24 or more cylinders.

The method may be performed in whole or in part by operation of a controller. The controller may comprise hardware and/or software. The controller may comprise a control unit or may be a computer program running on a dedicated or shared computing resource. The controller may comprise a single unit or may be composed of a plurality of sub-units that are operatively connected. The controller may be located on one processing resource or may be distributed across spatially separate computing resources. The controller may comprise one or more programmable and or non-programmable memory units or sub-units. The controller may comprise data storage and handling units or sub-units. The controller may comprise or form part of an engine electronic control module (ECM) operatively connected to the engine.

Figure 2:
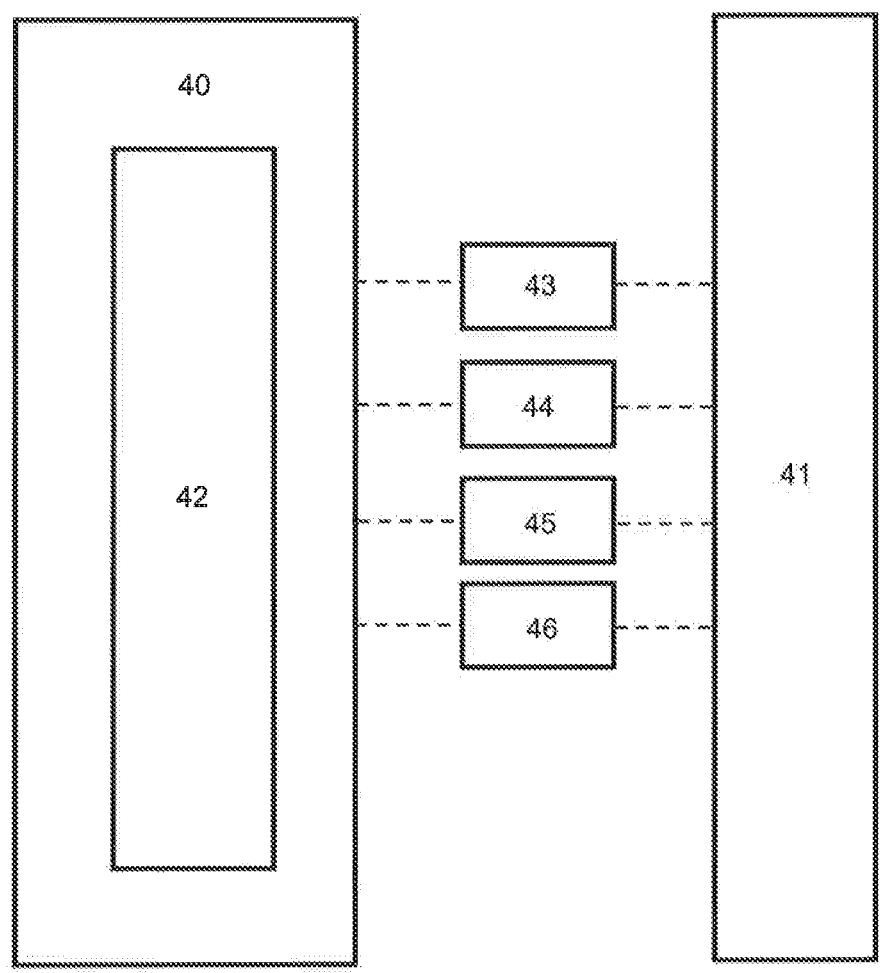
FIG. 2 is a schematic view of an engine and a controller for illustrating operation of the method.

FIG. 2 shows a schematic view of an engine 40 and a controller 41 for illustrating operation of the method. The engine 40 may comprises a plurality of cylinders 42.

The controller 41 may utilise as part of the method one or more variables associated with operation of the engine 40. The variables may comprise one or more of an engine speed 43, an engine coolant temperature 44, an engine intake manifold temperature 45 and an engine load factor 46.

The engine 40 and/or controller 41 may comprise one or more associated sensors for detecting, determining, calculating or inferring the aforementioned variables. For example, one or more of an engine coolant temperature sensor, an engine intake manifold temperature sensor, an engine speed sensor, an engine manifold absolute pressure sensor, a throttle position sensor and an air intake sensor may be provided.

At step 1 an engine start command is provided. The engine start command may comprise actuation of a virtual or physical key, switch, button or other actuator. In some embodiments the engine start command is provided by a key 50 that is used to operate an ignition controller. Starting of the engine 40 may be under the control of the controller 41.

At step 2, the controller 41 may check whether the enablement conditions for the cylinder cut-out mode are deemed as OK. The enablement conditions may be deemed as OK when one or more of the following statements are TRUE:
the cylinder cut-out mode is enabled in the controller 41;
no fault conditions are detected in the fuel injectors associated with the cylinders 42 of the engine 40;
no fault conditions are detected associated with the engine speed 43 or engine speed sensor; and
the engine speed 43 is not zero.

Optionally, the enablement conditions may be deemed as OK only when all of the above statements are TRUE.

The cylinder cut-out mode may be enabled only once the enablement conditions have been deemed as OK.

If the enablement conditions are deemed as OK the method may move on to step 3.

If at step 2 the enablement conditions are not deemed as OK the method may move via arrow 21 to step 10. At step 10 the controller may designate the cylinder cut-out mode as OFF. The method may then move to step 11 in which the engine 40 may be run with the cylinder cut-out mode deactivated (i.e. with all cylinders 42 of the engine 40 being active) until the engine 40 is stopped by operation of the key 50 (or other actuator).

At step 3, with the enablement conditions deemed as OK, the controller 41 may check whether entry conditions for the cylinder cut-out mode are MET. The entry conditions may be deemed as MET when one or more of the following statements are TRUE:
the engine coolant temperature 44 is below or equal to an engine coolant temperature threshold;
the engine intake manifold temperature 45 is below or equal to an engine intake manifold temperature threshold; and
the engine load factor 46 is below or equal to an engine load factor threshold.

Optionally, the entry conditions may be deemed as MET only when all of the above statements are TRUE.

The cylinder cut-out mode may be entered only once the entry conditions have been deemed as MET.

The engine coolant temperature threshold may be set at a temperature of −60 to 150° C., optionally −40 to 90° C.

The engine intake manifold temperature threshold may be set at a temperature of −60 to 300° C., optionally −40 to 60° C.

The engine load factor threshold may be set at a percentage of 0 to 120%, optionally 1 to 100%.

Optionally, one or more of the variables of the engine speed 43, the engine coolant temperature 44, the engine intake manifold temperature 45 and the engine load factor 46 may be associated with a debounce variable that may function to prevent the controller 41 calling on the respective variable too frequently or acting too hastily to the respective variable exceeding its threshold value. For example, the variable of the engine coolant temperature 44 may have a debounce variable set at a time of 0 to 60 seconds. For example, the engine intake manifold temperature 45 may have a debounce variable set at a time of 0 to 60 seconds. For example, the engine load factor 46 may have a debounce variable set at a time of 0 to 10 seconds.

At step 3, if the entry conditions are MET the method may move on to step 4.

At step 3, if the entry conditions are NOT MET the method may move via arrow 22 to step 10. At step 10 the controller may designate the cylinder cut-out mode as OFF. The method may then move to step 11 in which the engine 40 may be run with the cylinder cut-out mode deactivated until the engine 40 is stopped by operation of the key 50 (or other actuator).

At step 4 the controller 41 may determine whether the engine speed 43 is below or equal to an engine speed threshold. The engine speed threshold may be a speed of 0 to 2000 rpm. The engine speed threshold may be used to determine if there is no engine speed or an inadequate engine speed to require or warrant the cylinder cut-out mode to be activated.

At step 4, if the engine speed 43 is below or equal to the threshold then the method may move via arrow 23 to step 10. At step 10 the controller may designate the cylinder cut-out mode as OFF. The method may then move to step 11 in which the engine 40 may be run with the cylinder cut-out mode deactivated (i.e. with all cylinders of the engine 40 being active) until the engine 40 is stopped by operation of the key 50 (or other actuator).

At step 4, the controller 41 may determine whether the engine 40 is cranking (i.e. being started from an off condition) or running. If the engine 40 is cranking, the method may move via arrow 24 to step 5. If the engine 40 is running, the method may move via arrow 25 to step 6.

The controller 41 may determine whether the engine 40 is cranking or running by monitoring the engine speed. The determinant may be, for example, a specified rpm engine speed or a predetermined offset from a desired rpm engine speed. For example, if a desired running speed (which may, optionally, be a fixed desired running speed) for the engine 40 is 3000 rpm the controller 41 may be configured to treat engine speeds below, for example, 2900 rpm as the engine 40 undergoing cranking and speeds above 2900 rpm as the engine 40 running. In another example, the controller 41 may be configured to treat engine speeds within, for example, 100 rpm of a desired running speed as the engine 40 running and all lower speeds as cranking. The controller 41 may be configured such that once the engine 40 is determined to be running, the engine 40 cannot be determined to be cranking until the engine 40 is shut-off and restarted.

At step 5 the controller 41 may monitor a cranking functionality of the engine 40. The cranking functionality may be encountered, for example, during start-up of the engine 40.

At step 5 the controller 41 may check whether the enablement conditions for the cylinder cut-out mode are deemed as NOT OK. The enablement conditions may be deemed as NOT OK when one or more of the following statements are NOT TRUE:

the cylinder cut-out mode is enabled in the controller 41;
no fault conditions are detected in the fuel injectors associated with the cylinders 42 of the engine 40;
no fault conditions are detected associated with the engine speed 43 or engine speed sensor;
the engine speed 43 is not zero;
the cylinder cut-out mode has been active for a time longer than 10 to 30 seconds.

Optionally, the enablement conditions may be deemed as NOT OK only when any one of the above statements are NOT TRUE.

If the enablement conditions are deemed as NOT OK the method may move on to step 10. At step 10 the controller may designate the cylinder cut-out mode as OFF. The method may then move to step 11 in which the engine 40 may be run with the cylinder cut-out mode deactivated (i.e. with all cylinders 42 of the engine 40 being active) until the engine 40 is stopped by operation of the key 50 (or other actuator).

Additionally or alternatively the method may move via arrow 26 to step 10 if the cylinder cut-out mode is no longer requested by the controller 41, for example if the engine 40 is in a droop mode. Droop mode may be used as an engine load vs speed factor feature which allows the engine 40 to receive load as a function of engine speed. This may function as an open loop engine governor.

At step 5 if the enablement conditions are OK and the cylinder cut-out mode is still requested by the controller 41 then the cylinder cut-out mode may be activated during cranking and run up to the desired engine speed.

At step 5 if, during cranking, the engine coolant temperature 44 exceeds the aforementioned engine coolant temperature threshold then the method may move via arrow 28 to step 7. At step 7 the cylinder cut-out mode may be suspended (i.e. any de-activated cylinders 42 may be reactivated) until the engine coolant temperature 44 returns under the engine coolant temperature threshold. Optionally, a coolant temperature hysteresis variable may be provided. The coolant temperature hysteresis variable may be for example 20° C. Optionally, the method may only return to step 5 via arrow 28 when the engine coolant temperature 44 has returned under a temperature equaling 'the engine coolant temperature threshold minus the coolant temperature hysteresis variable'. For example, when:

Engine coolant temperature threshold=90° C.
Coolant temperature hysteresis variable=20° C.

the cylinder cut-out mode will be suspended when the engine coolant temperature 44 exceeds 90° C. and will be reactivated once the engine coolant temperature 44 returns below 70° C. (90° C.−20° C.=70° C.).

As noted above, the engine coolant temperature 44 may have a debounce variable set at a time of 0 to 60 seconds. As such, the method may not move from step 5 to step 7 unless the engine coolant temperature 44 persists above the engine coolant temperature threshold for a period of at least that set as the debounce variable.

At step 5, the method may move via arrow 27 to step 6 once cranking has been completed. As noted above the point of moving from step 5 to step 6 may be determined by the controller 41 by monitoring the engine speed. The determinant may be, for example, a specified rpm engine speed or a predetermined offset from a desired rpm engine speed.

At step 6 the controller 41 may monitor an idle mode of the engine 40. The idle mode may be encountered, for example, during running of the engine 40 after start-up and in particular may be encountered during idling of the engine 40 or when the engine is under low load conditions.

At step 6 if, during idling, the engine load factor 46 exceeds the aforementioned engine load factor threshold the method may move via arrow 33 to step 9 in which the controller 41 may monitor a loading functionality of the engine 40. As noted above, the engine load factor 46 may have a debounce variable set at a time of 0 to 10 seconds. As such, the method may not move from step 6 to step 9 unless the engine load factor 46 persists above the engine load factor threshold for a period of at least that set as the debounce variable.

At step 6 if, during idling, the engine coolant temperature 44 exceeds the aforementioned engine coolant temperature threshold then the method may move via arrow 29 to step 7. Step 7 functions in the same manner as described above, except that the method may return via arrow 29 to step 6 when the engine coolant temperature 44 returns under the engine coolant temperature threshold or engine coolant temperature threshold plus the coolant temperature hysteresis variable. The move from step 6 to step 7 may comprise a debounce variable as discussed above with respect to the move from step 5 to step 7.

At step 6 if, during idling, the engine speed 43 exceeds a desired engine speed (for example a desired engine idle speed) by greater than an engine speed threshold amount the method may move via arrow 30 to step 8 in which the controller 41 may pause the cylinder cut-out mode (i.e. temporarily reactivate any deactivated cylinders 42). The engine speed threshold amount may be a fixed value of rpm, a percentage value of the desired engine speed rpm, etc. For example, the engine speed threshold amount may be set at a value of 1 to 300 rpm. In one example the threshold amount is set as 30 rpm.

At step 8 the method may return to step 6 once the engine speed 43 has returned to within the engine speed threshold amount of the desired engine speed, optionally for a debounce time. On return to step 6 the cylinder cut-out mode may be un-paused. The debounce time may be for example a time from 0 to 10 seconds.

The controller 41 may be configured with a pause limit variable to limit the number of times the method may visit step 8 before disabling the cylinder cut-out mode completely until the engine 40 is stopped and re-started. The pause limit variable may be 2, 3, 4 or 5 for example.

For example, when:
Desired engine idle speed=1200 rpm
Engine speed threshold amount=200 rpm
Debounce time=5 seconds
Visit limit=2
the method may function as follows:

| Timestamp (secs) | Engine idle speed (rpm) | Cylinder cut-out mode |
|---|---|---|
| 0 | 1200 | Active |
| 2 | 1380 | Active |
| 3 | 1450 | Paused (Pause 1) |
| 5 | 1400 | Paused (Debounce active) : |
| 10 | 1300 | Active (Debounce ended) |
| 12 | 1200 | Active |
| 15 | 1450 | Paused (Pause 2) |
| 20 | 1350 | Paused (Debounce active) |
| 25 | 1250 | Active (Debounce ended) |
| 27 | 1280 | Active |
| 30 | 1430 | Stopped (until engine restart) |

At step 9 the controller 41 may monitor a loading functionality of the engine 40. The loading functionality may be encountered, for example, during running of the engine 40 when the engine is under medium or high load conditions.

At step 6 and/or at step 9 the controller 41 may check whether the enablement conditions for the cylinder cut-out mode are deemed as NOT OK. The enablement conditions may be deemed as NOT OK when one or more of the following statements are NOT TRUE:
the cylinder cut-out mode is enabled in the controller 41;
no fault conditions are detected in the fuel injectors associated with the cylinders 42 of the engine 40;
no fault conditions are detected associated with the engine speed 43 or engine speed sensor;
the engine speed 43 is not zero;
Optionally, the enablement conditions may be deemed as NOT OK only when any one of the above statements are NOT TRUE.

If the enablement conditions are deemed as NOT OK the method may move from step 6 and/or from step 9 to step 10 via respective arrows 32 and 34. At step 10 the controller may designate the cylinder cut-out mode as OFF. The method may then move to step 11 in which the engine 40 may be run with the cylinder cut-out mode deactivated (i.e. with all cylinders 42 of the engine 40 being active) until the engine 40 is stopped by operation of the key 50 (or other actuator).

Additionally or alternatively the method may move via respective arrows 32 and 34 to step 10 if the cylinder cut-out mode is no longer requested by the controller 41, for example if the engine 40 is in a droop mode.

Additionally or alternatively the method may move via respective arrows 32 and 34 to step 10 if the engine speed 43 exceeds an engine speed maximum threshold for the engine 40, which may be for example 50 rpm above the engine's rated maximum speed and/or the engine load factor 46 exceeds an engine load factor maximum threshold for the engine 40, which may be for example 25% above the engine's maximum rated load factor.

Additionally or alternatively the method may move via respective arrows 32 and 34 to step 10 if the controller 41 detects that a cylinder's ability to combust fuel is compromised and/or if the controller 41 detects receipt of a Controller Area Network (CAN) Bus message indicating an intention to apply load to the engine 41.

INDUSTRIAL APPLICABILITY

The present disclosure may find application in controlling a cylinder cut-out mode for an engine.

The engine may be or comprise an internal combustion engine (ICE). The ICE may use diesel as its primary fuel. In some examples the engine may be a diesel genset engine.

The present disclosure may find particular benefit where the engine is operated in cold conditions—for example where an ambient temperature surrounding the engine is less than 10° C. In such conditions, it can be a challenge to start an engine without starting aids, especially for ICEs that use diesel as the primary fuel. For example, in cold conditions there may be multiple cylinders that do not combust until load is applied to the engine or the engine coolant warms up. Poor incomplete combustion may lead to unfavourable conditions such as increased vibration, noise and emission of white smoke—indicative of unburnt hydrocarbons.

According to the present disclosure there is provided a method of controlling a cylinder cut-out mode of an engine that may assist with engine operation, especially in cold conditions.

The method of controlling a cylinder cut-out mode for an engine of the present disclosure may comprise the steps of:
a) activating a cylinder cut-out mode in which one or more cylinders of the engine are deactivated;
b) while the cylinder cut-out mode is active, monitoring one or more deactivation variables; the one or more deactivation variables comprising one or more of:
an inlet manifold air temperature;
an engine load factor;
an engine speed; and
an engine coolant temperature; and
c) deactivating the cylinder cut-out mode in order to reactivate any deactivated cylinders when at least one of the deactivation variables exceeds its threshold value.

In step b) the step additionally or alternatively may comprise monitoring one or more of:
a cylinder's ability to combust fuel; and
receipt of a CAN Bus message indicating an intention to apply load to the engine.

In step c) the cylinder cut-out mode may be deactivated when any of the deactivation variables exceeds its threshold value.

In step a) the cylinder cut-out mode may be activated during a cranking mode of the engine and/or an idling mode of the engine.

In step b) the cylinder cut-out mode may be active during an idling mode of the engine.

In step c) when the engine load factor and/or the inlet manifold air temperature exceeds its threshold value the cylinder cut-out mode may be deactivated until the engine is stopped and re-started.

Deactivating the cylinder cut-out mode once the engine load factor threshold is exceeded may beneficially prevent the maximum cylinder pressures being exceeded on the activated cylinders.

In step c) when the engine coolant temperature exceeds its threshold value the cylinder cut-out mode may be deactivated until the engine coolant temperature reduces below its threshold value, optionally until the engine coolant temperature reduces below its threshold value by a hysteresis amount.

In step c) when the engine speed exceeds its threshold value the cylinder cut-out mode may be deactivated until the engine speed reduces below its threshold value, optionally until the engine speed reduces below its threshold value for a predetermined period of time.

In step c) the cylinder cut-out mode may be enabled to go through a predetermined maximum number of deactivation and reactivation cycles due to the engine speed exceeding its threshold value and thereafter a further instance of the engine speed exceeding its threshold value results in the cylinder cut-out mode being deactivated until the engine is stopped and re-started.

An engine of the present disclosure may comprise a plurality of cylinders and a controller, the controller may be enabled to activate a cylinder cut-out mode in which one or more of the plurality of cylinders are deactivated;

the controller may be configured to:
a) activate the cylinder cut-out mode;
b) monitor one or more deactivation variables while the cylinder cut-out mode is active; the one or more deactivation variables comprising one or more of:
an inlet manifold air temperature;
an engine load factor;
an engine speed; and
an engine coolant temperature; and
c) deactivate the cylinder cut-out mode in order to reactivate any deactivated cylinders when at least one of the deactivation variables exceeds its threshold value.

The controller may additionally or alternatively be configured to monitor one or more of:
a cylinder's ability to combust fuel; and
receipt of a CAN Bus message indicating an intention to apply load to the engine.

A controller of the present disclosure for controlling a cylinder cut-out mode of an engine, may be configured to:
a) activate the cylinder cut-out mode;
b) monitor one or more deactivation variables while the cylinder cut-out mode is active; the one or more deactivation variables comprising one or more of:
an inlet manifold air temperature;
an engine load factor;
an engine speed; and
an engine coolant temperature; and
c) deactivate the cylinder cut-out mode in order to reactivate any deactivated cylinders when at least one of the deactivation variables exceeds its threshold value.

The controller may additionally or alternatively be configured to monitor one or more of:
a cylinder's ability to combust fuel; and
receipt of a CAN Bus message indicating an intention to apply load to the engine.

Advantageously, the present disclosure may enable the operating of a cylinder cut-out mode that may reduce excessive vibration, noise and the emission of white smoke from an engine while ensuring that the cylinder cut-out mode is deactivated when desirable. In particular the method may permit control of a cylinder cut-out mode during an idling mode of the engine.

It is to be understood that at least some of the figures and descriptions of the disclosure have been simplified to focus on elements that are relevant for a clear understanding of the disclosure, while eliminating, for purposes of clarity, other elements that the reader skilled in the art will appreciate may also be required. Because such elements are well known to the reader skilled in the art, and because they do not necessarily facilitate a better understanding of the disclosure, a description of such elements is not provided herein.

What is claimed is:

1. A method of controlling a cylinder cut-out mode for an engine comprising the steps of:
   a) activating a cylinder cut-out mode in which one or more cylinders of the engine are deactivated;
   b) while the cylinder cut-out mode is active, monitoring one or more deactivation variables; the one or more deactivation variables comprising one or more of:
      an inlet manifold air temperature;
      an engine coolant temperature; and
   c) deactivating the cylinder cut-out mode in order to reactivate any deactivated cylinders when at least one of the deactivation variables exceeds its threshold value.

2. The method of claim 1, wherein in step b) the step additionally or alternatively comprises monitoring one or more of:
   a cylinder's ability to combust fuel; and
   receipt of a CAN Bus message indicating an intention to apply load to the engine.

3. The method of claim 1, wherein in step c) the cylinder cut-out mode is deactivated when any of the deactivation variables exceeds its threshold value.

4. The method of claim 1, wherein in step a) the cylinder cut-out mode is activated during a cranking mode of the engine and/or an idling mode of the engine.

5. The method of claim 1, wherein in step b) the cylinder cut-out mode is active during an idling mode of the engine.

6. The method of claim 1, wherein in step c) when an engine load factor and/or an inlet manifold air temperature exceeds its threshold value the cylinder cut-out mode is deactivated until the engine is stopped and re-started.

7. The method of claim 1, wherein in step c) when the engine coolant temperature exceeds its threshold value the cylinder cut-out mode is deactivated until the engine coolant temperature reduces below its threshold value, optionally until the engine coolant temperature reduces below its threshold value by a hysteresis amount.

8. The method of claim 1, wherein in step c) when an engine speed exceeds its threshold value the cylinder cut-out mode is deactivated until the engine speed reduces below its threshold value, optionally until the engine speed reduces below its threshold value for a predetermined period of time.

9. The method of claim 1, wherein in step c) the cylinder cut-out mode is enabled to go through a predetermined maximum number of deactivation and reactivation cycles due to the engine speed exceeding its threshold value and thereafter a further instance of the engine speed exceeding its threshold value results in the cylinder cut-out mode being deactivated until the engine is stopped and re-started.

10. The method of claim 1, wherein the engine is a diesel engine, optionally a diesel genset engine.

11. The method of claim 1, wherein an ambient temperature surrounding the engine is less than 10° C.

12. The method of claim 1, wherein in step b) the step additionally comprises monitoring one or more of:
- an engine load factor; and
- an engine speed.

13. An engine comprising a plurality of cylinders and a controller, the controller being enabled to activate a cylinder cut-out mode in which one or more of the plurality of cylinders are deactivated;
the controller being configured to:
- a) activate the cylinder cut-out mode;
- b) monitor one or more deactivation variables while the cylinder cut-out mode is active; the one or more deactivation variables comprising one or more of:
  - an inlet manifold air temperature; and
  - an engine coolant temperature; and
- c) deactivate the cylinder cut-out mode in order to reactivate any deactivated cylinders when at least one of the deactivation variables exceeds its threshold value.

14. The engine of claim 13, wherein in step b) the controller is additionally or alternatively configured to monitor one or more of:
- a cylinder's ability to combust fuel; and
- receipt of a CAN Bus message indicating an intention to apply load to the engine.

15. The engine of claim 14, wherein the engine is a diesel engine, optionally a diesel genset engine.

16. The engine of claim 13, wherein in step b) the controller is additionally configured to monitor one or more of:
- an engine load factor; and
- an engine speed.

17. A controller for controlling a cylinder cut-out mode of an engine, the controller being configured to:
- a) activate the cylinder cut-out mode;
- b) monitor one or more deactivation variables while the cylinder cut-out mode is active; the one or more deactivation variables comprising one or more of:
  - an inlet manifold air temperature; and
  - an engine coolant temperature; and
- c) deactivate the cylinder cut-out mode in order to reactivate any deactivated cylinders when at least one of the deactivation variables exceeds its threshold value.

18. The controller of claim 17, wherein in step b) the controller is additionally or alternatively configured to monitor one or more of:
- a cylinder's ability to combust fuel; and
- receipt of a CAN Bus message indicating an intention to apply load to the engine.

19. The controller of claim 17, wherein in step b) the controller is additionally configured to monitor one or more of:
- an engine load factor; and
- an engine speed.

* * * * *